United States Patent
Dick et al.

(10) Patent No.: US 7,966,714 B2
(45) Date of Patent: *Jun. 28, 2011

(54) MULTI-STEP SYSTEMS FOR PROCESSING WORKPIECES

(75) Inventors: Spencer B. Dick, Portland, OR (US);
Stuart Aldrich, Portland, OR (US);
David A. Morgan, Portland, OR (US);
David Lee, Vancouver, WA (US)

(73) Assignee: Precision Automation, Inc., Vancouver, WA (US)

( * ) Notice: Subject to any disclaimer, the term of this patent is extended or adjusted under 35 U.S.C. 154(b) by 0 days.
This patent is subject to a terminal disclaimer.

(21) Appl. No.: 11/702,905

(22) Filed: Feb. 5, 2007

(65) Prior Publication Data
US 2007/0240547 A1    Oct. 18, 2007

Related U.S. Application Data

(63) Continuation of application No. 10/964,553, filed on Oct. 12, 2004, now Pat. No. 7,171,738.

(51) Int. Cl.
*B23P 23/00* (2006.01)
*B23Q 41/00* (2006.01)

(52) U.S. Cl. ............ 29/563; 29/558; 29/26 A; 29/564.8; 29/897; 29/525.11; 144/360; 144/35.1; 700/95; 700/117; 700/171; 700/167

(58) Field of Classification Search .............. 29/563, 29/33 P, 564, 26 A, 564.6, 564.8, 407.09, 29/558, 897, 897.312, 897.32, 407.05, 407.1, 29/525.11, 557; 144/356, 357, 360, 387, 144/388, 392, 397, 426, 3.1, 35.1, 1.1, 382, 144/394, 404; 408/4, 12; 83/75.5, 468, 221, 83/600; 700/95–96, 117, 159, 171, 167, 700/174
See application file for complete search history.

(56) References Cited

U.S. PATENT DOCUMENTS

| | | | |
|---|---|---|---|
| 491,307 | A | 2/1893 | Gaylord |
| 1,271,473 | A | 7/1918 | Johnson |
| 2,108,823 | A | 2/1938 | Lyon |
| 2,200,894 | A | 5/1940 | Rasmussen |
| 2,315,458 | A | 3/1943 | Sellmeyer |
| 2,577,766 | A | 12/1951 | Johnson et al. |
| 2,602,477 | A | 7/1952 | Kniff |
| 2,731,989 | A | 1/1956 | Valcourt et al. |
| 2,740,437 | A | 4/1956 | Odlum et al. |
| 2,852,049 | A | 9/1958 | Peterson |
| 3,019,823 | A | 2/1962 | Cornell |
| 3,170,736 | A | 2/1965 | Wright |
| 3,186,453 | A | 6/1965 | Green |
| 3,329,181 | A | 7/1967 | Buss et al. |
| 3,459,246 | A | 8/1969 | Ottosson |

(Continued)

OTHER PUBLICATIONS

"TigerStop Application Guide". Application Guide for PF90 Computer Controlled Saw. Precision Automation Inc. 2005.
*Defendant Technical Services, Inc.'s Memorandum in Support of Its Motion for Partial Summary Judgment re: Patent Infringement Claims and to Dismiss State Law Claims*, D.Or., Case No. CV.07-707 AC, dated May 27, 2008 (35 pages).
*Technical Services, Inc.'s Revised Invalidity Contentions*, D.Or., Case No. CV.07-707 AC, dated Oct. 1, 2008 (59 pages).
*TigerStop Application Guide*, Precision Automation, Inc. 2000, 12 pages total.

(Continued)

*Primary Examiner* — Erica E Cadugan
(74) *Attorney, Agent, or Firm* — Kolisch Hartwell, P.C.

(57) ABSTRACT

Systems, including method and apparatus, for processing workpieces driven automatically along a linear path to a plurality of positions disposed substantially along the linear path. In some embodiments, a workpiece may be processed at one or more of the positions using two or more processing stations, such as a first processing station that cuts the workpiece into segments and a second processing station that performs another processing operation on the workpiece.

2 Claims, 5 Drawing Sheets

U.S. PATENT DOCUMENTS

| | | |
|---|---|---|
| 3,483,904 A | 12/1969 | Jacumin |
| 3,566,239 A | 2/1971 | Taniguchi |
| 3,584,284 A | 6/1971 | Beach |
| 3,736,968 A | 6/1973 | Mason |
| 3,738,403 A | 6/1973 | Schwoch |
| 3,780,777 A | 12/1973 | Davies |
| 3,811,353 A | 5/1974 | Miles |
| 3,814,153 A | 6/1974 | Schmidt |
| 3,841,462 A | 10/1974 | Schmidt |
| 3,854,889 A | 12/1974 | Lemelson |
| 3,886,372 A | 5/1975 | Sanglert |
| 3,910,142 A | 10/1975 | Jureit et al. |
| 3,917,078 A | 11/1975 | Schmidt |
| 3,941,019 A | 3/1976 | Baldwin et al. |
| 3,994,484 A | 11/1976 | Schorr |
| 4,055,097 A | 10/1977 | Ducret |
| 4,111,088 A | 9/1978 | Ziegelmeyer |
| 4,144,449 A | 3/1979 | Funk et al. |
| 4,221,974 A | 9/1980 | Mueller et al. |
| 4,243,081 A | 1/1981 | Pritelli |
| 4,260,001 A | 4/1981 | De Muynck |
| 4,286,880 A | 9/1981 | Young |
| 4,358,166 A | 11/1982 | Antoine |
| 4,410,025 A | 10/1983 | Sicotte |
| 4,434,693 A | 3/1984 | Hosoi |
| 4,453,838 A | 6/1984 | Loizeau |
| 4,454,794 A | 6/1984 | Thornton |
| 4,469,318 A | 9/1984 | Slavic |
| 4,472,783 A | 9/1984 | Johnstone et al. |
| 4,499,933 A | 2/1985 | Thompson |
| 4,541,722 A | 9/1985 | Jenks |
| 4,596,172 A | 6/1986 | Visser |
| 4,658,687 A | 4/1987 | Haas et al. |
| 4,694,871 A | 9/1987 | Jenkner |
| 4,725,961 A | 2/1988 | Pearl |
| 4,736,511 A | 4/1988 | Jenkner |
| 4,791,757 A | 12/1988 | Orlando |
| 4,794,963 A | 1/1989 | Oppeneer |
| 4,805,505 A | 2/1989 | Cantlin |
| 4,830,075 A | 5/1989 | Jenkner |
| 4,874,996 A | 10/1989 | Rosenthal |
| 4,878,524 A | 11/1989 | Rosenthal et al. |
| 4,879,752 A | 11/1989 | Aune et al. |
| 4,901,992 A | 2/1990 | Dobeck |
| 4,939,739 A | 7/1990 | Hobart et al. |
| 5,001,955 A | 3/1991 | Fujiwara |
| 5,042,341 A | 8/1991 | Greten et al. |
| 5,054,938 A | 10/1991 | Ide |
| 5,058,474 A | 10/1991 | Herrera |
| 5,094,282 A | 3/1992 | Suzuki et al. |
| 5,119,855 A | 6/1992 | Knighten et al. |
| 5,142,158 A | 8/1992 | Craig, Jr. |
| 5,176,060 A | 1/1993 | Thornton |
| 5,197,172 A | 3/1993 | Takagi et al. |
| 5,201,258 A | 4/1993 | Cremona |
| 5,201,351 A | 4/1993 | Hurdle, Jr. |
| 5,251,142 A | 10/1993 | Cramer |
| 5,254,859 A | 10/1993 | Carman et al. |
| 5,266,878 A | 11/1993 | Makino et al. |
| 5,365,812 A | 11/1994 | Harnden |
| 5,418,729 A | 5/1995 | Holmes et al. |
| 5,443,554 A | 8/1995 | Robert |
| 5,444,635 A | 8/1995 | Blaine et al. |
| 5,460,070 A | 10/1995 | Buskness |
| 5,472,028 A | 12/1995 | Faulhaber |
| 5,489,155 A | 2/1996 | Ide |
| 5,524,514 A | 6/1996 | Hadaway et al. |
| 5,663,882 A | 9/1997 | Douglas |
| 5,664,888 A | 9/1997 | Sabin |
| RE35,663 E | 11/1997 | Mori et al. |
| 5,772,192 A | 6/1998 | Hoffmann |
| 5,797,685 A | 8/1998 | Jurik et al. |
| 5,798,929 A | 8/1998 | Stenzel et al. |
| 5,829,892 A | 11/1998 | Groves |
| 5,865,080 A | 2/1999 | Jackson |
| 5,933,353 A | 8/1999 | Abriam et al. |
| 5,938,344 A | 8/1999 | Sabin |
| 5,953,232 A | 9/1999 | Blaimschein |
| 5,960,104 A | 9/1999 | Conners et al. |
| 5,964,536 A | 10/1999 | Kinoshita |
| 6,052,882 A | 4/2000 | Campbell |
| 6,058,589 A | 5/2000 | Hakansson |
| 6,062,280 A | 5/2000 | Newnes et al. |
| 6,120,628 A | 9/2000 | Pritelli |
| 6,144,895 A | 11/2000 | Govindaraj et al. |
| 6,216,574 B1 | 4/2001 | Hain |
| 6,263,773 B1 | 7/2001 | McAdoo et al. |
| 6,272,437 B1 | 8/2001 | Woods et al. |
| 6,314,379 B1 | 11/2001 | Hu et al. |
| 6,379,048 B1 | 4/2002 | Brissette |
| 6,390,159 B1 | 5/2002 | Pinske |
| 6,422,111 B1 | 7/2002 | Rousseau |
| 6,463,352 B1 | 10/2002 | Tadokoro et al. |
| 6,470,377 B1 | 10/2002 | Sevcik et al. |
| 6,510,361 B1 | 1/2003 | Govindaraj et al. |
| 6,520,228 B1 | 2/2003 | Kennedy et al. |
| 6,549,438 B2 | 4/2003 | Malone |
| 6,594,590 B2 | 7/2003 | Woods et al. |
| 6,618,692 B2 | 9/2003 | Takahashi et al. |
| 6,631,006 B2 | 10/2003 | Dick et al. |
| 6,640,855 B2 * | 11/2003 | Giles .................. 144/357 |
| 6,675,685 B2 | 1/2004 | Ceroll et al. |
| 6,690,990 B1 | 2/2004 | Caron et al. |
| 6,701,259 B2 | 3/2004 | Dor et al. |
| 6,735,493 B1 | 5/2004 | Chou et al. |
| 6,764,434 B1 | 7/2004 | Volk |
| 6,886,462 B2 | 5/2005 | Dick et al. |
| 6,898,478 B2 | 5/2005 | Dick et al. |
| 7,080,431 B2 | 7/2006 | Dick et al. |
| 7,171,738 B2 | 2/2007 | Dick et al. |
| 2002/0157101 A1 | 10/2002 | Dick |
| 2003/0041919 A1 * | 3/2003 | Giles .................. 144/357 |
| 2004/0027038 A1 | 2/2004 | Gaesser et al. |
| 2009/0103977 A1 * | 4/2009 | Dick et al. ............. 403/381 |
| 2009/0105870 A1 * | 4/2009 | Dick et al. ............. 700/171 |
| 2009/0105871 A1 * | 4/2009 | Dick et al. ............. 700/171 |
| 2009/0105872 A1 * | 4/2009 | Dick et al. ............. 700/171 |

OTHER PUBLICATIONS

*Declaration of Spencer B. Dick in Support of Supplemental Information Disclosure Statement* with attached Exhibits A and B (Letter TSI to Pella dated Feb. 4, 2002 (Exhibit A) and Letter TSI to Integrity letter dated Jun. 27, 2002 (Exhibit B).

*Tigerstop Manual Version 3.0*, Precision Automation, Inc. Jul. 2005, 50 pages total.

*TigerLink 3.2 User Guide*, Precision Automation, Inc. 2005, 15 pages total.

*The Ultimizer* brochure, Ultimizers Inc., 2000, 8 pages total.

*The Ardis Concept*, webpage printouts, Ardis Information Systems, N.V., Jun. 23, 2001 archive version, accessed Jun. 12, 2007, 8 pages total.

Technical Services, Inc.'s 1985 Response to a bid request by Fruehauf Corporation, 17 pages total.

*Modern Wooworking*, cover page and pp. 111 and 143, Aug. 2002, 3 pages total.

R & R Drummond, Inc., web page printouts, Jun. 29, 2001 archive version, accessed Jun. 11, 2007, 2 pages total.

Affidavit of Mark Caspers in Support of Defendant Technical Services, Inc.'s Opposition to Plaintiff's Motion for Preliminary Injunction dated Oct. 5, 2007 with Exhibits A-C describing prior sales of Mill Vision and Mill Vision XLT, D.Or, Case No. 07-707-AS.

Affidavit of Daniel J. Dew in Support of Defendant Technical Services, Inc.'s Opposition to Plaintiff's Motion for Preliminary Injunction dated Nov. 20, 2007 with Exhibits A-D describing prior sales of Mill Vision and Mill Vision XLT, D.Or, Case No. CV 07-707 AS.

*Decision Granting Ex Parte Reexamination* dated Apr. 14, 2006, Reexamination Control No. 90/007,925 re Patent No. 6,886,462, 8 pages total.

*Decision Granting Ex Parte Reexamination* dated Aug. 25, 2006, Reexamination Control No. 90/007,857 & 90/007,925 re Patent No. 6,886,462, 23 pages total.

* cited by examiner

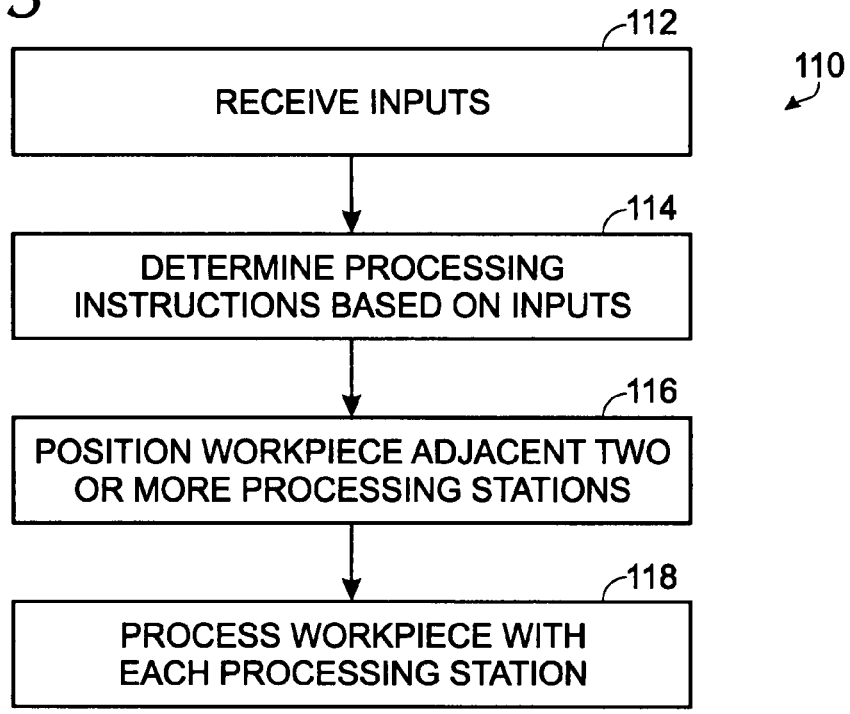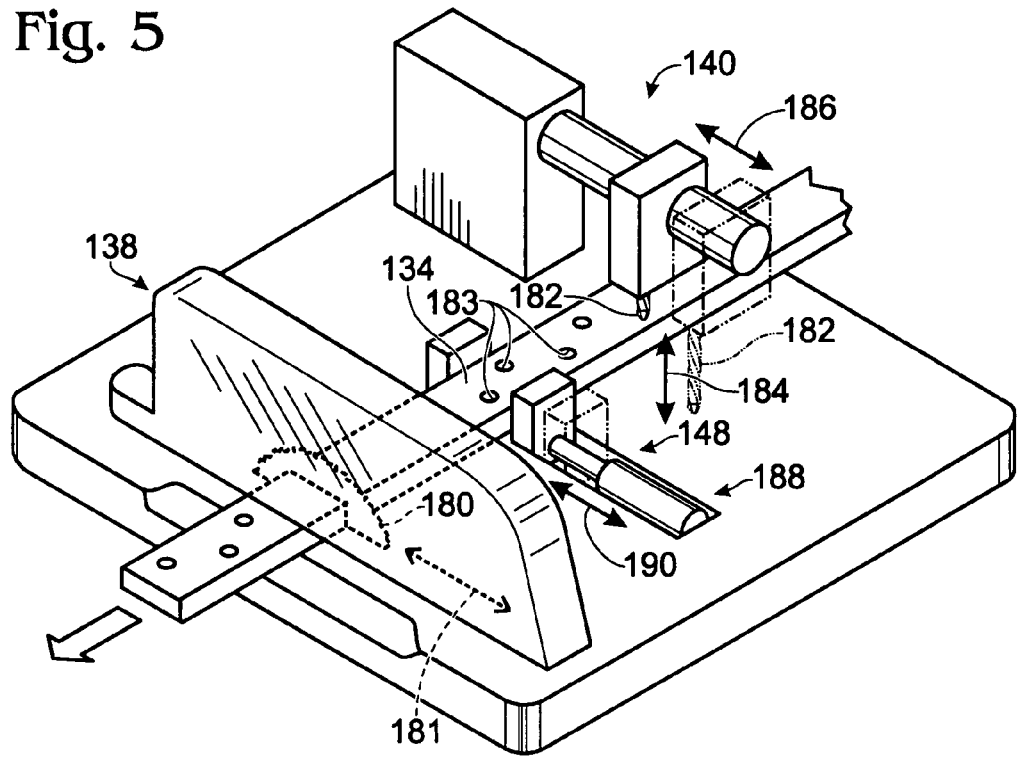

MULTI-STEP SYSTEMS FOR PROCESSING WORKPIECES

CROSS-REFERENCE TO RELATED APPLICATION

This is a continuation patent application of U.S. patent application Ser. No. 10/964,553 filed Oct. 12, 2004, issuing as U.S. Pat. No. 7,171,738 on Feb. 6, 2007.

CROSS-REFERENCES TO RELATED MATERIALS

This application incorporates by reference the following U.S. Pat. Nos. 491,307; 2,315,458; 2,731,989; 2,740,437; 2,852,049; 3,886,372; 3,994,484; 4,111,088; 4,144,449; 4,286,880; 4,434,693; 4,541,722; 4,596,172; 4,939,379; 4,658,687; 4,791,757; 4,805,505; 4,901,992; 5,042,341; 5,142,158; 5,201,258; 5,251,142; 5,254,859; 5,443,554; 5,444,635; 5,460,070; 5,524,514; 5,960,104; 6,216,574; 6,549,438; and 6,631,006.

This application also incorporates by reference the following U.S. patent applications: Ser. No. 10/104,492, filed Mar. 22, 2002; now abandoned, Ser. No. 10/642,349, filed Aug. 15, 2003; now U.S. Pat. No. 7,073,422, Ser. No. 10/642,350, filed Aug. 15, 2003; now abandoned, Ser. No. 10/642,351, Aug. 15, 2003; now U.S. Pat. No. 6,918,329, Ser. No. 10/645,826, filed Aug. 20, 2003; now U.S. Pat. No. 7,031,789, Ser. No. 10/645,827, filed Aug. 20, 2003; Ser. No. 10/645,828, filed Aug. 20, 2003; now U.S. Pat. No. 6,941,864, Ser. No. 10/645,831, filed Aug. 20, 2003; now U.S. Pat. No. 6,886,462, Ser. No. 10/645,832, filed Aug. 20, 2003; now U.S. Pat. No. 7,080,431, Ser. No. 10/645,865, filed Aug. 20, 2003; now U.S. Pat. No. 6,898,478, Ser. No. 10/897,997, filed Jul. 22, 2004; now U.S. Pat. No. 7,428,443, and Ser. No. 10/958,690, filed Oct. 4, 2004, titled "System for Forming Dados," and naming Spencer B. Dick, as inventor, now abandoned.

This application also incorporates by reference the following U.S. provisional patent application Ser. No. 60/574,863, filed May 26, 2004.

BACKGROUND

Many manufactured goods are constructed from components that are cut from stock material, processed further, and then assembled. For example, wood products, such as cabinets, often are constructed in a series of operations including cutting components of the appropriate length from stock lumber, modifying each component to facilitate assembly (and/or to add functionality and/or improve appearance), and then assembling the modified components. Performing of these operations can be inefficient, even when one or more of the operations are automated. For example, an automated saw may use a computer to determine where to cut stock lumber for construction of cabinets according to a user-supplied list of the required lengths of cabinet components (i.e., a cut list). The computer controls sites of cutting along the stock lumber based on the cut list and in a manner that optimizes utilization of the lumber to create the cabinet components. However, the cabinet components are generally handled to reposition them between cutting and further modification (such as drilling, marking, forming a joint surface, etc.), adding substantial time and expense to the construction of cabinets. A more efficient approach to processing components from stock material thus is needed.

SUMMARY

The present teachings provide systems, including method and apparatus, for processing workpieces driven automatically along a linear path to a plurality of positions disposed substantially along the linear path. In some embodiments, a workpiece may be processed at one or more of the positions using two or more processing stations, such as a first processing station that cuts the workpiece into segments and a second processing station that performs another processing operation on the workpiece.

BRIEF DESCRIPTION OF THE DRAWINGS

FIG. 3 is a flowchart of a sequence of operations that may be performed in an exemplary method of processing workpieces at two or more processing stations, in accordance with aspects of the present teachings.

FIG. 5 is a view of selected portions of the system of FIG. 4, particularly the drill station and saw station and their relationship to an exemplary workpiece, in accordance with aspects of the present teachings.

DETAILED DESCRIPTION

The present teachings provide systems, including method and apparatus, for processing workpieces driven automatically along a linear path (a processing path) to a plurality of positions disposed substantially along the linear path. In some embodiments, a workpiece may be processed at one or more of the positions using two or more processing stations. One of the processing stations may be a cutting station, for example a saw station, that cuts through the workpiece to create segments (a segmented form of the workpiece). A computer may receive data about the workpiece, such as its length, positions of one or more defects, if any, in the workpiece, and a cut list defining a characteristic dimension (e.g., the length) of each of a set of desired products. The computer may select sites along the workpiece where cutting is to be performed, according to the cut list and to optimize use of the workpiece (and, optionally, to exclude one or more defects of the workpiece from each of the workpiece products). The computer also may control operation of a workpiece drive mechanism that moves the workpiece along the linear path for cutting at the selected sites by the cutting station to produce segments corresponding in length to one or more of the desired products (unless slated to be shortened by additional processing). Other processing operations (such as drilling, marking, routing, sawing at another saw station, sanding, deburring, fluid addition, member addition, etc.) also may be performed on the workpiece, generally under control of the computer, during a single pass of the workpiece past the processing stations. Accordingly, the systems of the present teachings may offer increased automation, more rapid workpiece processing, less operator handling, and/or higher production efficiencies, among others.

Figure 1:
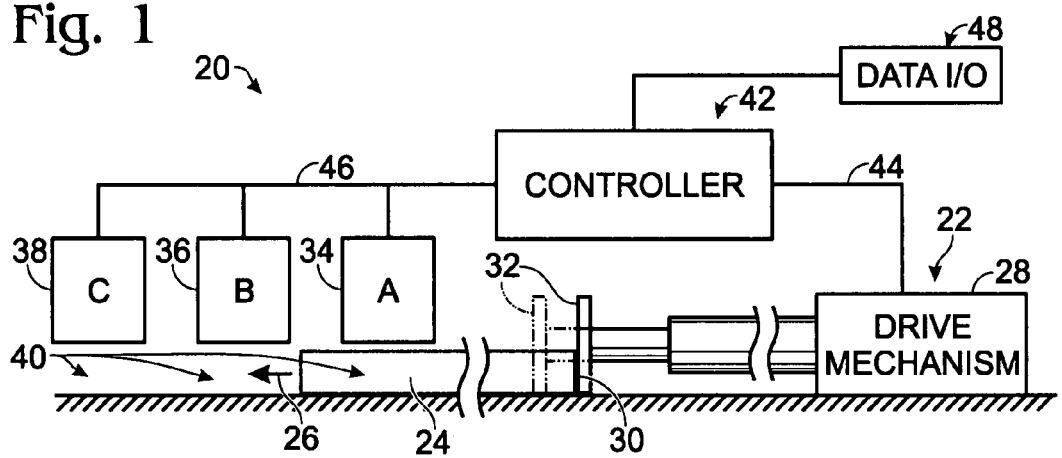
FIG. 1 is a schematic view of an exemplary system for processing workpieces driven along a linear path past a plurality of processing stations disposed generally along the linear path, in accordance with aspects of the present teachings.

FIG. 1 shows an exemplary system 20 for processing workpieces with two or more processing stations. System 20 may include a drive mechanism 22 for moving a workpiece 24 along a linear path 26. In the present illustration, drive mechanism 22 is configured as a pusher mechanism or pusher 28 that engages a distal end region 30 of the workpiece and advances (and stops) adjustably, indicated in phantom outline at 32, to push the workpiece forward. The drive mechanism may move the workpiece past two or more processing stations disposed generally along and/or adjacent the linear path. In the present illustration, system 20 includes three processing stations 34, 36, 38 (labeled "A," "B," and "C," respectively). However, two, four, or more processing stations may be included. The processing stations may modify the workpiece at positions, shown at 40, substantially along the linear path to form one or more workpiece products.

System 20 also may include at least one controller 42 (a computer) in communication with drive mechanism 22, shown at 44, and generally also in communication with each processing station, shown at 46. A controller or computer, as used herein, is any programmable electronic machine for processing information (data). The controller is configured to control operation of the workpiece drive mechanism, to move the workpiece automatically into position for modification by the processing stations. In some examples, the controller also may be configured to control operation of one or more (or all) of the processing stations, to automate modification of the workpiece during and/or after movement of the workpiece into and/or through processing stations. Data thus may be received by the controller and/or sent from the controller using communication pathways, such as communication links 44, 46 and/or data input/output devices 48. The terms "automatically" and "automated," as used herein, refer to operations or processes (or processing stations) that do not require human intervention for their execution (or actuation in processing). For example, processing a workpiece automatically with a pusher mechanism and one or more processing stations means that the pusher mechanism and the one or more processing stations can operate in coordination to modify the workpiece without human intervention after the pusher mechanism begins moving the workpiece toward the processing stations. The term "manually" or "manual," as used herein, refer to processes or operations (or processing stations) that involve human intervention for their execution (or actuation in processing). In some examples, one or more of the processing stations may be operated manually during processing, for example, a saw station that cuts workpieces with manual movement of a power-driven blade of the station through workpieces.

Figure 2:
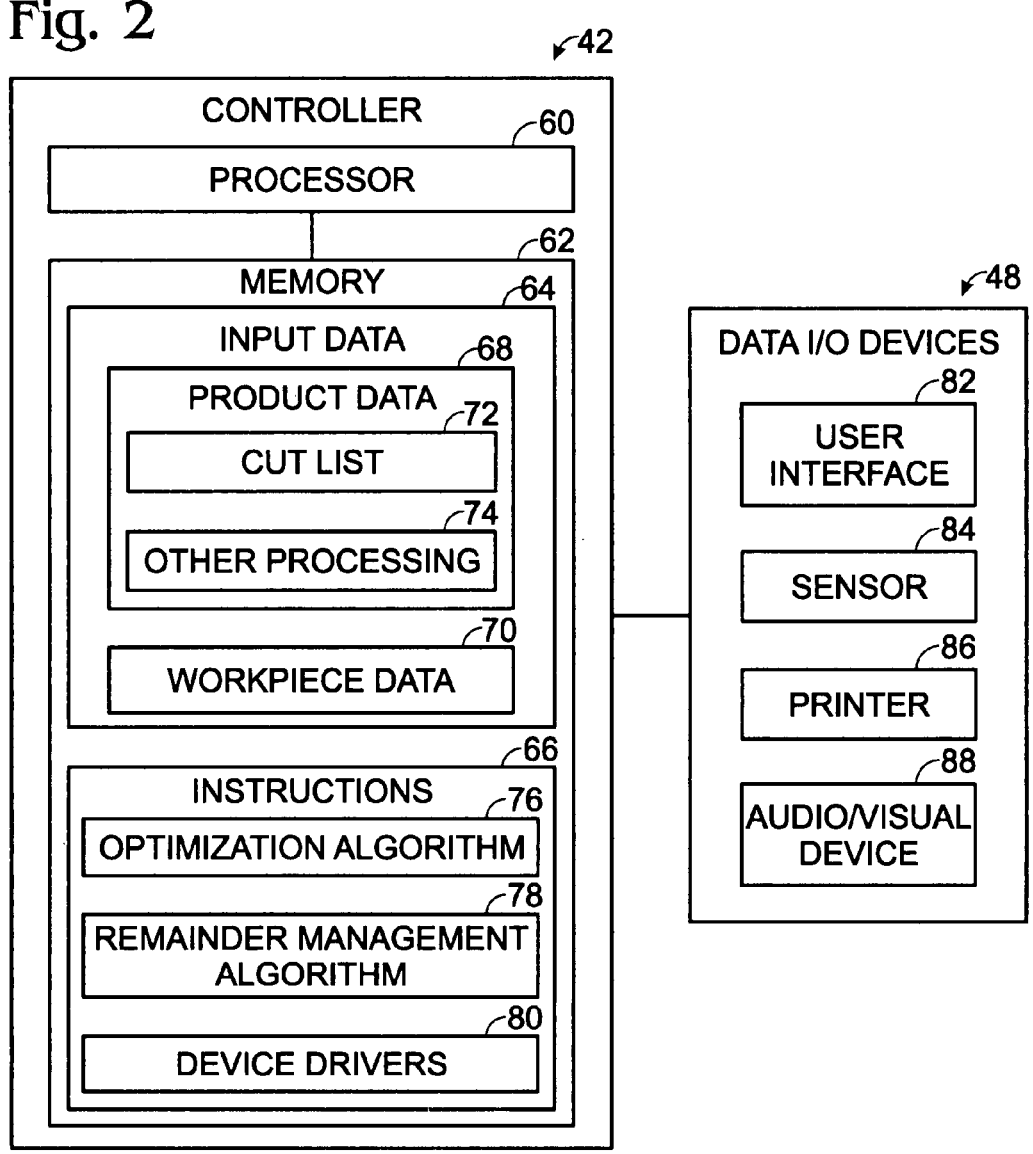
FIG. 2 is a schematic view of a controller and data input/output devices of the system of FIG. 1, in accordance with aspects of the present teachings.

FIG. 2 shows an exemplary schematic configuration of selected portions of controller 42 and connected input/output devices 48.

Controller 42 may include a processor 60 and memory 62, among other devices. Processor 60 may be configured to process data, for example, by performing arithmetic, logical, and/or other operations on the data. Memory 62 may include input data 64 received, for example, from communication links 44, 46 (see FIG. 1) and/or input/output devices 48. Memory also may include instructions 66, generally in the form of software, for processing data and/or instructing operation of the workpiece drive mechanism, processing stations, and/or other devices of the system.

Input data 64 may include any suitable data related to workpieces, products, modes of processing, user-defined preferences for processing or system operation, etc. Exemplary input data may include product data 68 and workpiece data 70.

Product data 68 may be information about desired products and/or about workpiece products already produced by the system, among others. Information about desired products may include a cut list 72 with cut list data corresponding to a characteristic dimension (e.g., the length) of each desired product (and/or longer precursors (of the desired products) that are slated for additional shortening in the system, such as by processing of newly cut ends). Accordingly, the cut list may define the spacing between cuts within a workpiece and/or between a cut and the end of the workpiece, among others. The cut list (and/or the product list) also may provide data corresponding to the relative or absolute number of each desired product that the system should produce. Information about desired products also or alternatively may include data corresponding to a list of other processing operations, shown at 74, to be performed on workpieces. For example, the list of other processing operations may include a drill list with data corresponding to positions on desired products at which holes should be formed (and/or the depth/angle of each hole), a joinery list with data corresponding to joinery structures (e.g., joint surfaces) to be created in desired products, a marking list with data corresponding to positions at (and content of) surface marks to be created on each desired product, etc. Accordingly, the list of other processing operations may be related to desired products having lengths formed by cutting workpieces, although these other processing operations may be conducted before, during, and/or after workpieces are cut into segments having lengths corresponding (approximately or substantially) to desired products. In some examples, other processing operations may be specified by processing rules that allow processing positions to be calculated for each desired product based, for example, on the length of the desired product. Exemplary processing rules may include processing at the longitudinal midpoint of a desired product, processing at a constant spacing from the opposing ends of a desired product, etc.

Workpiece data 70 may be information about any suitable aspect of a workpiece to be processed by the processing stations of the system. Exemplary workpiece data may include a characteristic dimension (e.g., the length, width, and/or thickness, among others) of the workpiece, grade of workpiece (and/or its material), type of workpiece, composition, shape, appearance (such as its color), defect data (e.g., position(s), type of defect, degree of defect, etc.), and/or the like. Further aspects of workpieces and data that may be input about workpieces are included in Sections IV and V.

Instructions 66 may be configured to use input data 64 about a workpiece and desired products, among others, to generate processing instructions that control automated operation of the workpiece drive mechanism and/or the processing stations (see FIG. 1).

Exemplary instructions may include an optimization algorithm 76. The optimization algorithm may be configured to optimize utilization of each workpiece based on data about desired products (and, optionally, based also on products already produced). In particular, the optimization algorithm may be configured to optimize utilization of each workpiece based on cut list 72. Accordingly, the optimization algorithm may select sites along a workpiece at which the workpiece will be cut into segments, based on desired products indicated by the cut list. The sites may be selected according to the length of the workpiece, the position(s) and length of defects in the workpiece, and other aspects of the workpiece, such as the grade of workpiece material. Optimization of the use of a workpiece may include selecting cutting sites so that workpiece defects, if any (as determined by a person operating the system and/or automatically), are excluded from workpiece products formed from the workpiece.

Other exemplary instructions may include a remainder management algorithm 78 to manage processing of remainder material. Remainder material, as used herein, is one or more segments of a workpiece that will not be processed into workpiece products corresponding to desired products. The remainder material may include a defect and/or may be a portion of the workpiece too short to form a product on the cut list after cutting sites have been selected on the workpiece. The management algorithm may determine, for example, whether each remainder segment should be cut into smaller pieces or not. Accordingly, the management algorithm may determine, for example, whether each remainder segment is thrown away or salvaged. In some examples, the management algorithm may manage sorting of workpiece products, alternatively or in addition to managing cutting and/or sorting of remainder material. Further aspects of processing remainder material for salvage or disposal are included in U.S. patent application Ser. No. 10/645,828, filed Aug. 20, 2003, now U.S. Pat. No. 6,941,864, which is incorporated herein by reference.

Additional exemplary instructions may include device drivers 80. Drivers 80 may be responsible for control signals or instructions sent to the workpiece drive mechanism and/or the processing stations, among others. A software driver for the workpiece drive mechanism may control operation of this drive mechanism and thus movement of a workpiece along a linear path. Drivers for the processing stations may control operation of each processing station, for example, by controlling a station drive mechanism for each station. Exemplary aspects of control for the workpiece drive mechanism (and/or workpiece), and/or processing stations may include speed, acceleration, distance of travel, starting position(s), stopping position(s), and/or actuation/de-actuation times, among others. In some examples, aspects of the controller, and particularly device drivers, may be included in the workpiece drive mechanism and/or processing stations.

Data input/output devices 48 may be disposed in communication with the controller.

Exemplary input/output devices may include one or more user interfaces 82, such as a keyboard, a keypad, a mouse, a screen, and/or a joystick, among others, to allow an operator to input data to the controller, for example, by pressing keys and/or through a graphical user interface. Alternatively, or in addition, the operator may input data more directly into controller memory from a portable memory storage device holding input data that was added to the storage device using another computing device.

Other exemplary input/output devices may include at least one sensor 84, such as a distance, position, velocity, or activity sensor, among others. The sensor may be configured, for example, to permit an operator to input data about workpieces (e.g., dimensional, defect, and/or grade data, among others), and/or may sense this data automatically (e.g., by sensing an end and/or defect of the workpiece and/or by sensing machine-readable indicia on the workpiece). In some examples, a sensor may be configured to sense manual operation of a processing station by a person during otherwise automated processing. For example, the sensor may inform the computer that a person has performed a cut in a workpiece, so that the computer can instruct the drive mechanism to advance to workpiece for additional processing or output.

Addition exemplary input/output devices may include one or more printers 86 to output data. The printer may be configured, for example, to print data about workpieces, workpiece processing (such as numbers/types of products, time of processing, etc.), user preferences, etc. Alternatively, or in addition, the printer may be configured to print labels for workpiece products. The labels may be applied manually or automatically to the products. Further aspects of label printing are included in U.S. patent application Ser. No. 10/645,831, filed Aug. 20, 2003, now U.S. Pat. No. 6,886,462, which is incorporated herein by reference. In some examples, a printing device (a printhead) may be included in a processing station to apply a colorant (such as ink) to a workpiece (see Examples 2 and 3).

In some examples, the input/output devices may include one or more audio/visual devices 88. Each audio/visual device may be configured to create an audible or visible signal for an operator of the system. Exemplary audible signals may include a buzzer, a bell, a tone, a whistle, a spoken word, and/or the like. Exemplary visible signals may include a light(s). The light or lights may be of different colors, intensities, positions, and/or flashing durations/patterns, among others, to signal different information. The signals may be configured to indicate any suitable aspect of data input, data output, workpiece processing, and/or system operation, among others. For example, the signals may indicate that data (such as workpiece length, grade, defect position(s)) has or has not been input successfully, that workpiece processing has been initiated, that workpiece processing is complete, a malfunction of the system, etc.

FIG. 3 shows a flowchart of method steps that may be performed in an exemplary method 110 of processing workpieces at two or more processing stations in a processing system. The steps shown may be performed in any suitable order, in any suitable combination, and any suitable number of times.

Inputs may be received, shown at 112. The inputs may be received by a controller and may include any data related to a workpiece to be processed, desired products, processing parameters, system parameters, and/or the like. The inputs may be provided to the controller from an operator, automatically (such as from a sensor), and/or by data processing, among others.

Processing instructions may be determined based on the inputs, shown at 114. The processing instructions may include any aspects of how the workpiece drive mechanism, processing stations, and/or other system devices operate. For example, the processing instructions may include where (and/or when/how) the workpiece drive mechanism (and generally the workpiece) starts and stops, when (and/or where/how) the processing stations modify the workpiece, and/or the like.

The workpiece may be positioned adjacent (and/or in) two or more processing stations, shown at 116. A workpiece positioned adjacent and/or in a processing station is disposed to be engaged by a portion of the processing station and/or a component released therefrom (such as an expelled component, e.g., ink, a fastener, a spacer element, etc.).

The workpiece may be processed with each processing station, shown at 118. The action of the processing stations forms one or more workpiece products.

Further aspects of the present teachings are described in the following sections, including, among others, (I) processing stations, (II) drive mechanisms, (III) support/guide structures, (IV) workpieces, (V) input of workpiece and product data, and (VI) examples.

I. PROCESSING STATIONS

The systems of the present teachings each may include two or more processing stations for processing workpieces. The term "processing," as used herein, can be any action or set of actions that result in structural modification of a workpiece. A structural modification is any change in the shape, size, a surface aspect, and/or other intrinsic property of a workpiece, for example, by removing material from the workpiece, adding material to the workpiece, deforming the workpiece, and/or changing the molecular structure of the workpiece, among others. Accordingly, a processing station is any portion of a system that can effect processing of a workpiece. Each processing station generally includes a machine or set of machines configured to perform a processing operation, and an associated space in which the processing can be performed on a workpiece. A system with two or more processing stations may include distinct processing stations that perform two or more different types of processing operations and/or that can perform the same type of processing operation at different positions (for example, at the same time).

A processing station may include a processing element that engages a workpiece and/or ejects a material or projectile toward the workpiece. Exemplary processing elements that engage a workpiece may include a blade, a drill bit, a router bit, a pen, a tip, a scribe, a brush, etc. Exemplary processing elements that eject (or fire) a material or projectile toward the workpiece, with, or more generally without workpiece contact, may include a printhead, a sprayer, a dropper, a projectile gun, etc. (Exemplary projectiles may include spacers, fasteners, joint members (e.g., dowels, biscuits, butterfly locks, etc.). and/or the like. Processing elements may have any suitable disposition and/or direction of travel relative to a workpiece. For example, processing elements may be disposed above, below, laterally, and/or adjacent an end of the workpiece (and/or a segment thereof). Furthermore, processing elements may be movable translationally and/or pivotably, in any suitable direction, including downward, upward, transverse, oblique, and/or longitudinal motion, among others, relative to the workpiece. This motion may position the processing element at a suitable position along the length, width, and/or depth of the workpiece, and in some examples (e.g., drilling, sawing, and/or routing, among others), may introduce the processing element into and/or through the workpiece. Accordingly, the processing elements may be configured to process faces, edges and/or ends of workpieces.

Movement of processing elements, termed processing movement, to dispose the elements in operational position relative to workpieces, is generally computer controlled. However, processing elements also may have a basic repetitive operating motion, such as rotation, reciprocation, and/or travel along a looped path, among others, which may be actuated separately by an element driver, and thus may or may not be computer controlled.

The processing stations of a system may have any suitable positional, functional, and operational relationship. Two or more of the processing stations may be disposed upstream and downstream of one another, generally along a processing path. Alternatively, or in addition, two or more of the processing stations may have about the same position along the processing path, for example, when the processing stations occupy substantially nonoverlapping positions around the workpiece. The processing stations may have a fixed or adjustable positional relationship relative to one another (and/or to the workpiece), particularly along the processing path of the workpiece. Accordingly, in some examples, the processing stations may be movable to the same position in the processing path. The processing stations may perform processing operations on a workpiece at any suitable relative times. For example, the processing stations may operate in a sequential manner on the same region of the workpiece (e.g., forming a cavity in a region with a first station, and then placing a component in the cavity with a second station), may operate at overlapping times on the workpiece (e.g., cutting a workpiece at a saw station as the workpiece is being drilled at a drill station), and/or may operate at non-overlapping times on the workpiece (e.g., processing a workpiece using a station and during a first time period (or a first set of intervals), while the workpiece is moving, and processing the workpiece using another station and during a second, nonoverlapping time period (or set of nonoverlapping intervals), while the workpiece is not moving). Processing operations performed with two or more processing the stations, and workpiece movement, all may be coordinated by computer.

A processing station may be configured for removing material from a workpiece, to change the shape, size, and/or a surface aspect of the workpiece. Exemplary processing stations for removing material include a saw station (or another cutting station including a laser, knife, flame, electron beam, etc.) for cutting a workpiece, a router station for routing/milling a workpiece, a scorer station for scoring the surface of a workpiece, a sander station for smoothing the surface of a workpiece, a hole-forming or drill station for forming a hole in a workpiece, a borer station for widening a hole in a workpiece, a shearer station for shearing a workpiece, a deburrer station for deburring a cut end and/or other surface of a workpiece, a V-groove station for cutting a V-groove in a workpiece, a punch station for punching a hole in a workpiece, and/or the like.

A saw station may include any suitable type of saw, saw blade, blade orientation, and blade movement. Exemplary blades may include circular blades, band blades, and/or reciprocating blades, among others. The blades may be configured to perform crosscuts (generally transverse to the length of a workpiece; e.g., chop saws), rip cuts (generally along the length of a workpiece; e.g., rip saws), miter cuts, dado cuts, angle cuts, nonlinear cuts, etc. The saw station thus may include a motor that drives the blade rotationally (e.g., circular saws), around a loop (e.g., band saws), and/or back and forth (e.g., reciprocating saws). The driven saw blade may be configured to be actuated for cutting a workpiece by movement of the driven blade, generally computer-controlled movement, in any suitable direction relative to a workpiece, include translationally (e.g., a radial arm saw) and or along an arc through pivoting motion (e.g., a chop saw, using an upward and/or downward motion).

A drill station may include any suitable components and may operate by any suitable approach to a workpiece. The drill station may include a driver and a drill bit rotated by the driver. Positioning of drill bit may be controlled by computer. This positioning may be parallel to the long axis of the drill bit (to control depth of drilling for through-holes or recesses), and/or transverse to this axis. Accordingly, the depth of drilling may be controlled, to form through-holes or recesses. Also, the transverse, longitudinal, and/or vertical position of hole formation on a workpiece may be controlled, as may the angle of hole formation. Alternatively, or in addition, one or more aspects of the position of the driver may be set manually before the workpiece is processed.

A processing station may be configured to add material to a workpiece, to change the shape, size, and/or a surface aspect of the workpiece. Exemplary processing stations for adding material include a print station for adding one or more surface marks (an indicium or indicia) to a workpiece, a fastener station for adding a fastener to a workpiece (such as a nail, screw, bolt, rivet, bracket, hook, staple, dowel, biscuit, butterfly lock, spline, etc.), a coating station for adding a surface coating or fluid (e.g., paint, varnish, stain, sealant, glue, etc.) to a surface or surface region of a workpiece, a spacer station for adding a spacer element (e.g., a spacer ball, a block, a spline, etc.) to a workpiece, an assembly station that connects (e.g., joins) the workpiece with one or more other components, and/or the like.

A processing station may be configured to change the shape of a workpiece by deformation of the workpiece. Exemplary deformation may include bending, twisting, folding, compression, stamping, and/or the like.

A processing station may be configured to change the molecular structure of a workpiece. Exemplary operations that may be used to change the molecular structure of a workpiece, either globally or locally in the workpiece, may include heating, cooling, exposure to electromagnetic radiation (e.g., visible light, radiofrequency waves, microwaves, ultraviolet light, X-rays, gamma-rays, etc.) or particle radiation, compression, and/or the like.

II. DRIVE MECHANISMS

The systems of the present teachings each may include any suitable number of drive mechanisms. Each drive mechanism may be configured to move workpieces, workpiece products, a processing station(s), a processing element of a processing station, and/or the like. Drive mechanisms may be configured to move workpieces, products, stations, and/or elements translationally, rotationally, and/or pivotally, among others.

Operation of all or a subset of the drive mechanisms of a processing system may be computer controlled. A computer thus may control when a drive mechanism is actuated (movement starts), de-actuated (movement stops), the speed of the drive mechanism, acceleration of the drive mechanism, the direction of the drive mechanism, and/or the like. The drive mechanism may include an encoder that informs the computer of the position, speed, velocity, acceleration, and/or direction of a drive mechanism.

Each drive mechanism may include a motor and a mechanical linkage that couples operation of the motor to movement of a load. The load may include a conveyor belt, a pusher element that engages a distal end of the workpiece, and/or a portion or all of a processing station, among others.

Any suitable motor(s) may be used in the drive mechanism. Each motor may be an AC or DC electric motor, or may be air-powered or gas-powered, among others. Exemplary motors may be single or multiphase, universal, servo, induction, synchronous, stepper, and/or gear motors. Each motor may rotary or linear.

The drive mechanism may employ any suitable linkage to the load. Exemplary linkages may include a belt(s), a screw(s), a gear(s) (e.g., a worm gear), a chain(s), a cable(s), a pulley(s), a rod(s), a rack and pinion, and/or the like. The linkage also may include a guide structure or track that directs and/or facilitates sliding movement of the load. Accordingly, the guide structure or track may include bearings or other elements that promote sliding.

Workpieces may be moved along a linear path by a workpiece drive mechanism. The workpiece drive mechanism may be configured to engage any suitable surface of workpieces, such as a trailing end (as in a pusher mechanism) to push the workpieces, a face or edge (e.g., using a conveyor belt or conveyor wheels, among others) to carry or propel the workpieces, and/or a leading end region, to pull the workpieces. In exemplary embodiments, the pusher mechanism may include a worm gear formed of a threaded rod, and a worm wheel connected to a pusher carriage. Further aspects of pusher mechanisms that may be suitable are described in U.S. patent application Ser. No. 10/642,350, filed Aug. 15, 2003, now abandoned, which is incorporated herein by reference.

Processed workpieces (products) may be moved away from processing stations by any suitable drive mechanism(s). In some examples, the workpiece drive mechanism also may be used to push workpiece products through an outfeed site after their processing is complete. Alternatively, or in addition, products may be moved actively by a distinct product drive mechanism. The product drive mechanism may include a conveyor, for example, to carry the products farther, generally along the linear path of processing, to move the products laterally, and/or to carry the products in a direction generally opposite to the linear path. In some examples, the product drive mechanism may include a pusher mechanism that engages an edge of products and pushes them out of the linear path, for example, down a ramp and/or onto a conveyor.

A processing portion of a processing station may be moved by any suitable drive mechanism. For example, processing stations may include drive mechanisms that move processing portion of the stations relative to workpieces, for example, into engagement with the workpieces or into suitable proximity to the workpieces. The drive mechanisms thus may be operated, generally by computer control, to position processing sites on a workpiece and/or to conduct processing. In some examples, processing stations, such as fixed printheads that print on workpieces, may lack a drive mechanism so that they are stationary during operation.

A processing station may use distinct drive mechanisms for driving a processing element in its basic operating motion (e.g., rotating a circular saw blade) and for driving processing of the element with the processing element (e.g., moving the rotating circular saw blade through a workpiece). The element drive mechanism may or may not be computer controlled. However, the processing drive mechanism generally is computer controlled.

The systems of the present teachings may include a clamp mechanism that holds a workpiece in place as it is being processed by a processing station. The clamp mechanism may include a clamp member (or members) coupled to a drive mechanism, so that the clamp member can be moved into engagement with the workpiece to effect clamping, for example, when the workpiece is not moving, and can be moved out of engagement with the workpiece to permit movement of the workpiece by the workpiece drive mechanism. Operation of the clamp drive mechanism may be under computer control (i.e., automated). An exemplary clamp mechanism is shown and described in Example 1.

III. SUPPORT/GUIDE STRUCTURES

The systems of the present teachings may include various support and/or guide structures that support, guide, and/or facilitate movement of workpieces, processing stations, and/or processing portions of processing stations. For example, the support structures may include a table on which workpieces can slide. The table may include a rail or rails that restrict lateral movement of the workpieces, thus, along with the workpiece drive mechanism, defining the linear path along which workpieces are driven. The table and/or rails may include structures that facilitate sliding, such as wheels or bearings, among others. Processing stations may be attached to the table or to adjacent support structures. Upward and/or lateral movement of workpieces also or alternatively may be restricted or biased by a superior or lateral wheel and/or a clamp mechanism (see Section II). Further aspects of a wheel for biasing movement and/or creating drag are described in commonly owned, now expired, U.S. Provisional Patent Application Ser. No. 60/574,863, filed May 26, 2004, which is incorporated herein by reference.

IV. WORKPIECES

The systems of the present teachings process workpieces. A workpiece, as used herein, is any piece of material that will be, or is being, processed by a processing system. Accordingly, a workpiece may be in a raw or "unprocessed" form (before any processing by a system), in a partially processed form (during and/or after partial processing by the system), or in a fully processed form (after processing of the workpiece by the system has been completed and/or the workpiece has passed through the system). Each processing station of a system thus may process the raw form of the workpiece, a partially processed form of the workpiece (such as a workpiece cut into smaller pieces or segments (a segmented form of the workpiece) and/or modified otherwise), or both. The fully processed form of a workpiece, as used herein, is termed a workpiece product or product. Although "fully processed" by a first pass through the system, a product may be processed additionally outside the system or during a second pass through the system.

A workpiece may have any suitable composition. Workpieces thus may be formed of wood, metal, plastic, fabric, cardboard, paper, glass, ceramic, or a combination thereof, among others. The composition may be generally uniform or may vary in different regions of a workpiece (e.g., a wood workpiece with a vinyl coating). Exemplary workpieces are wood products, for example, sawn lumber, wood laminates, wood composites, etc. Other exemplary workpieces are metal sheets or strips.

A workpiece may have any suitable shape and size. Generally, the workpiece is elongate, so that the workpiece can be moved along a linear processing path that is parallel to the long axis of the workpiece. However, in some embodiments, the workpiece may not be elongate and/or may not be oriented so that the long axis of the workpiece is parallel to the linear processing path. The workpiece may have any suitable length. Exemplary lengths are based on available lengths of stock pieces, such as stock lumber of about six feet to twenty feet in length, for the purpose of illustration. In some examples, the workpiece may have a rectangular cross section, opposing ends, edges, and faces.

A workpiece may be of generic stock or may be preprocessed according to a particular application, before processing in a system. For example, the workpiece may be a standard piece of raw lumber. Alternatively, the workpiece, before processing by the system, may include one or more holes, grooves, ridges, surface coatings, markings, etc., created, for example, based on desired features of products to be formed by the system.

V. INPUT OF WORKPIECE AND PRODUCT DATA

Data about workpieces and/or desired products may input into a system, by communicating this data to a controller. The data may be input through any suitable user interface.

Any suitable data may be input about a workpiece. The data may relate to the type of workpiece, one or more characteristic dimensions (e.g., the length, width, and/or thickness, among others) of the workpiece, grade of workpiece material (e.g., high grade, medium grade, low grade, etc.); composition, shape, defect data (e.g., defect position(s), degree of defect, etc.), color, and/or the like.

Workpiece data may be input through the action of a person and/or automatically. Accordingly, the workpiece data may be input through a computer interface, such as a graphical user interface, a keyboard, a keypad, etc. Alternatively, or in addition, the workpiece data, particularly one or more characteristic dimensions and/or defect data about of the workpiece, may be input through a controller-linked measuring device. The measuring device may include an optical measuring device (e.g., see Example 1). Alternatively, or in addition, the measuring device may be an encoder-based measuring device that an operator can slide parallel to the length of a workpiece and selectively actuate, for example, by pushing a button, to send information about the relative position of the workpiece ends, one or more defects, and/or other workpiece features to the controller. Exemplary measuring devices that may be suitable for use in the processing systems of the present teachings are described in the patents and patent applications identified above under Cross-References, which are incorporated herein by reference, Any suitable data may be input about desired products to provide a product list. The data may correspond to the length of each product (a cut list), the absolute or relative number desired of each product, type(s) of processing to be included in each product, position(s) where processing should be performed for each product, order of processing operations for each product, etc. In some examples, the data may correspond to a destination for the product, such as a bin or chute, among others, to which the product should be direct automatically, so that products are sorted after processing.

VI. EXAMPLES

The following examples describe, without limitation, further aspects of the present teachings. These aspects include exemplary systems for processing workpieces driven along a linear path through (and/or adjacent) two or more processing stations, and exemplary processing stations for such systems, among others.

Example 1

Figure 4:
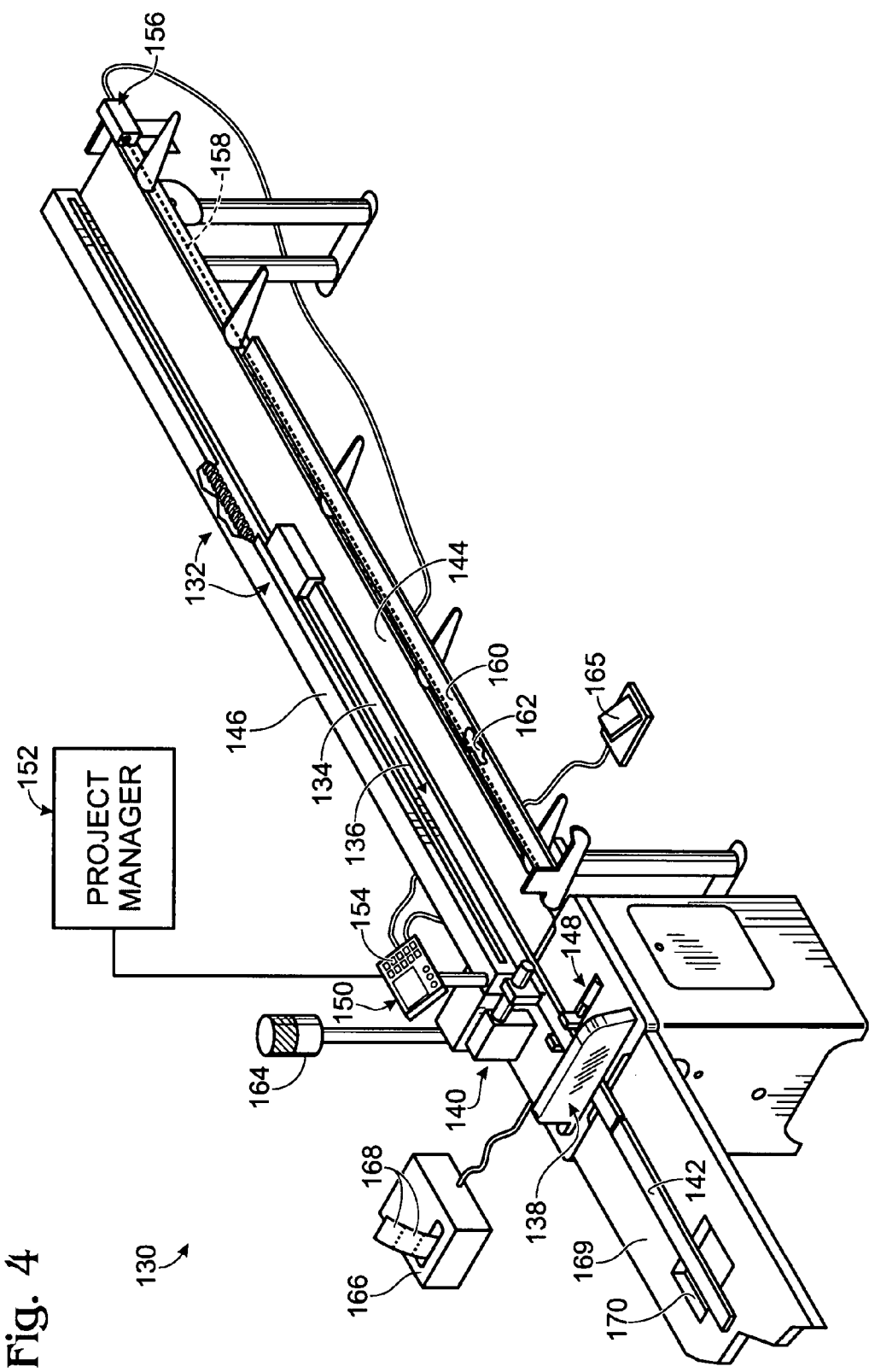
FIG. 4 is a view of an exemplary system for drilling and cutting workpieces driven along a linear path past a drill station and a saw station, in accordance with aspects of the present teachings.

This example describes an exemplary system for drilling and cutting workpieces driven along a linear path; see FIGS. 4 and 5.

FIG. 4 shows an exemplary system 130 for automated cutting (sawing) and drilling of workpieces driven along a linear path. System 130 may include a pusher mechanism 132 configured to push a workpiece 134 along a linear path 136. System 130 also may include a saw station 138 and a drill station 140 disposed at spaced positions generally along the linear path. The pusher mechanism thus may position the workpiece suitably along the linear path so that the saw station and drill station can saw and drill the workpiece to form one or more workpiece products 142. The workpiece may be supported by a table 144, guided by one or more guide rails 146, and held in position by a selectively actuable clamp mechanism 148.

System 130 may include one or more controllers (computers) for automating aspects of system operation. For example, the system may include a local controller 150 and a project management controller 152. The local controller may be configured to send instructions to, and thus control, each of the pusher mechanism, the saw station, and the drill station, so that movement of the workpiece along the linear path, cutting the workpiece, and drilling the workpiece each are automated. The local controller also may send instructions to, and thus control selective actuation (and de-actuation) of, the clamp mechanism. The local controller further may be configured to receive input data about workpieces and/or desired products, among others, and may optimize and coordinate processing of workpieces by the saw station and the drill station according to the products desired. Project management controller 152 may be used remotely from the local controller, to store, edit, combine, or modify data about desired products (and/or workpieces), such as cut/drill lists, prior to downloading one or more of the lists to the local controller.

Data (such as length, grade, type, etc.) about workpieces and/or system operation may be input by any suitable mechanism. For example, local controller 150 may include a keypad 154 through which data may be input in by an operator of the system. Alternatively, or in addition, system 130 may include an optical measuring device 156 that inputs data to the local controller based on a path followed by light 158. For example, interruption of the light path by an end of a future workpiece 160 to be processed after current workpiece 134, and/or by an object placed manually (using human energy) in the light path, may be used to input the length of the future workpiece and/or a position(s) of a defect 162 along the length of the future workpiece, among others. An audio/visual device, such as an indicator light 164, may be used to signal successful (and/or unsuccessful) input of data, such as length and/or defect positions, to the local controller. Signals, such as processing start or stop signals, among others, also may be input by using the optical measuring device as a "virtual keyboard" and/or with other user interfaces, such as keypad 154, a graphical user interface, or a foot pedal 165, among others.

System 130 also may include other devices or features to facilitate workpiece management. For example, the system may include a printer 166 configured to print labels 168 for manual or automatic application to workpiece products. System 130 also or alternatively may include an outfeed structure 169 configured to receive workpiece products, salvage pieces, and waste pieces. The outfeed structure may include a waste opening 170 sufficient to selectively receive only waste pieces. Accordingly, the system may be configured to cut pieces, designated for disposal, to a size small enough to fit through the waste opening. Further aspects of processing and separating salvage and waste pieces are described in U.S. patent application Ser. No. 10/645,828, filed Aug. 20, 2003, now U.S. Pat. No. 6,941,864, which is incorporated herein by reference.

FIG. 5 shows selected portions of system 130, particularly portions of saw station 138 and drill station 140, and their relationship to workpiece 134. Saw station 138 may include a saw blade 180 driven rotationally or reciprocably by a motor. Control of the saw station by the local controller may include moving the saw blade into engagement with the workpiece, for example, by instructing the saw station to move the saw blade upward, transverse, and/or downward to (and/or through) the workpiece. In the present illustration, the saw blade is instructed to cut the workpiece by transverse movement, shown at 181.

Drill station 140 may include a drill bit 182 driven to rotate and/or pivot by a motor to form one or more holes 183 in the workpiece. Operation of the drill station by the local controller may include instructing the drill station to move the drill bit into engagement with the workpiece, for example, by movement that is upward, transverse, oblique, and/or downward into (and/or through) the workpiece. In the present illustration, the drill bit approaches and moves away from the workpiece by downward and upward movement, respectively, along a vertical axis, shown at 184. The depth of drilling may be controlled by how far the drill bit is advanced into the workpiece. The drill station also may include a drive mechanism that moves the drill bit along a transverse axis, shown at 186 (and/or a longitudinal axis or vertical axis, among others), to adjust the transverse (and/or longitudinal or vertical) position at which the drill bit enters the workpiece. In some examples, the drill station may include a drive mechanism that permits automatic adjustment of the angle at which the drill bit drills the workpiece. In the present illustration, the drill station is closer to the pusher mechanism than the saw station. However, in alternative embodiments, the saw station may be closer to the pusher mechanism than the drill station, or they may be disposed at about the same distance from the pusher mechanism.

Clamp mechanism 148 may include a drive mechanism 188. The drive mechanism may move the clamp mechanism along an axis, shown at 190, that is transverse to the linear processing path, for example, a horizontal or vertical axis. The controller may be configured to instruct drive mechanism 188 when, where, and/or how to move, thus controlling its operation.

Example 2

Figure 6:
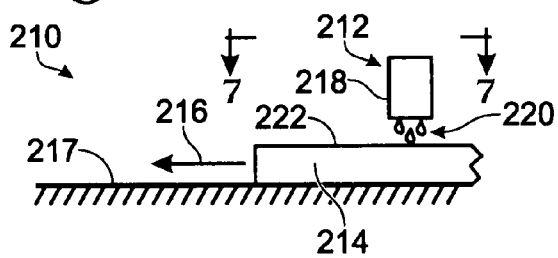
FIG. 6 is a schematic side elevation view of selected portions of another exemplary system for processing workpieces at a plurality of processing stations, particularly showing a print station printing indicia on a workpiece driven past the print station, in accordance with aspects of the present teachings.
Figure 7:
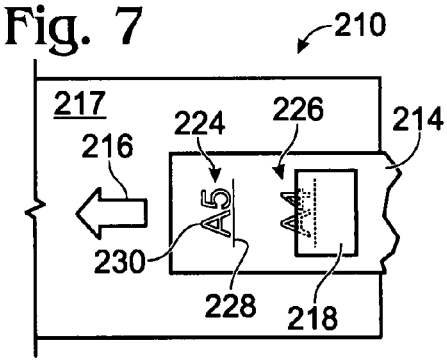
FIG. 7, is a plan view of the system of FIG. 6, taken generally along line 7-7 of FIG. 6.

This example describes an exemplary workpiece processing system with multiple processing stations, including a print station for printing indicia on a workpiece driven past the print station; see FIGS. 6-7.

FIG. 6 shows a side view of a workpiece processing system 210 including a print station 212. The print station may be configured to print indicia on a workpiece 214 driven along a linear path 216. The workpiece may be supported during printing and other processing by a support structure, such as a table having a horizontal support surface 217. The print station may include a printhead 218, for example, an inkjet printhead configured to fire ink droplets 220 onto a surface of the workpiece, for example, upper surface 222. The printhead may include a plurality of nozzles, from which individual droplets may be fired, such as by actuation of thin-film firing elements (e.g., thin-film heater elements and/or piezoelectric elements, among others). The print station may be fixed or movable during operation, for example, movable transverse to the linear path of workpiece movement. If fixed, the print station may print indicia while the workpiece is moving or not moving along the linear path. Operation of the print station while the workpiece is moving may increase the speed of workpiece processing, relative to printing only when the workpiece is stopped. In some examples, operation of the printhead may be coordinated with the position of the workpiece, based on an encoder in the workpiece drive mechanism.

FIG. 7 shows a plan view of system 210, taken generally along line 7-7 of FIG. 6. In the present illustration, workpiece 214 includes fully printed indicia 224 where the workpiece has advanced past the print station, and partially printed indicia 226 in the process of being printed by the print station. The indicia or surface marks may include one or more lines 228, one or more alphanumeric characters 230, one or more words, a bar code, a symbol, and/or the like. The indicia may be used, for example, to identify products and/or to guide additional processing or assembly of products. For example, in the present illustration, characters "A5" may identify a particular product or a particular end of a product. The characters (or other indicia, such as colors, symbols, etc.) also or alternatively may indicate which component (e.g., by name or part number) is to be assembled with the marked product, and vice versa, so that pairs of products may be marked to identify their partners for mating with one another. Line 228 may define, for example, an accurate position at which another component is to be attached to the workpiece (see Example 3).

Example 3

Figure 8:
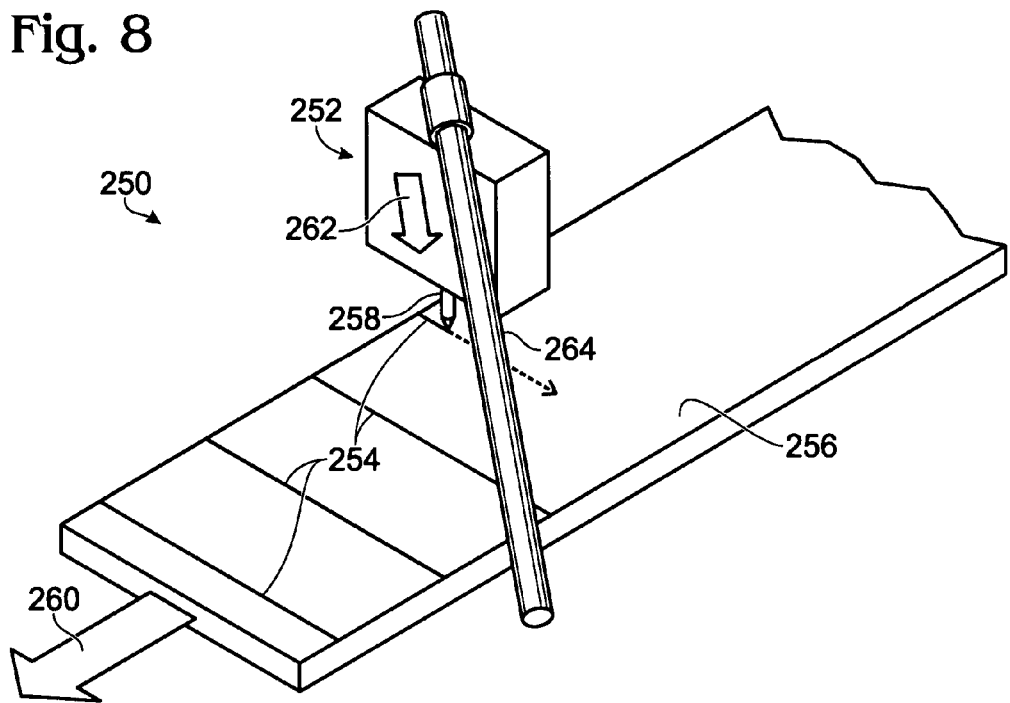
FIG. 8 is a somewhat schematic view of selected portions of still another exemplary system for processing workpieces at a plurality of processing stations, particularly showing a marker station marking a workpiece with transverse lines, in accordance with aspects of the present teachings.

This example describes an exemplary workpiece processing system with multiple processing stations, including a marking station for placing a visible surface mark (an indicium or indicia) on a workpiece driven past the marking station; see FIG. 8.

System 250 may include a marking station 252 that can place one or more surface marks such as lines 254 on a workpiece 256. The marking station may include a marking instrument, such as a pen 258, an inkjet device (see Example 2), or a scoring device (such as a scribe or sharp-pointed awl), among others, that creates a surface mark with ink (or another colorant of any suitable color, including black) or by scratching the workpiece surface, as the marking instrument moves across the workpiece. The marking instrument may be configured to form a mark that extends linearly (or nonlinearly) in a direction orthogonal, oblique, or parallel to the linear path 260 followed by the workpiece. An orthogonal mark may be formed by orthogonal movement of the marking instrument while the workpiece is not moving. Alternatively, or in addition, an orthogonal mark may be formed while the workpiece is moving, by oblique movement of the marking instrument, shown at 262, for example, along an obliquely disposed guide rail 264. The oblique movement may have an angle, for example 45°, and a speed selected so that the speed of forward movement of the workpiece along the linear path matches the speed of the marking instrument for travel parallel to the linear path. Alternatively, an oblique mark may be formed while the workpiece is moving or not moving. In some examples, the marking instrument may be replaced with a cutting instrument, such as a saw, to provide a flying crosscut that is created as the workpiece is moving. In any case, operation of the marking instrument or cutting instrument may be controlled by a computer and coordinated with operation of a drive mechanism that moves the workpiece along a linear path.

System 250 may be useful, for example, in forming parts for kitchen cabinets. Kitchen cabinets generally have a face frame that sits behind doors and/or drawers. The face frame may have a top rail, a bottom rail, and one or more intermediary rails each attached to opposing stiles. The position for future attachment of the intermediary rails may be marked on a workpiece (particularly a portion of the workpiece corresponding to a future stile) using marking station 252 of system 250. In some examples, marks may be placed on a workpiece before (and/or during and/or after) the workpiece is cut by a saw station of a processing system.

Example 4

Figure 9:
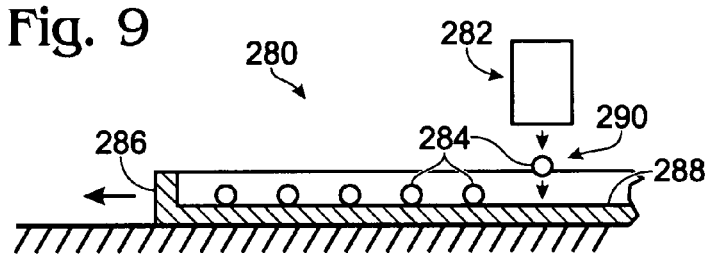
FIG. 9 is a somewhat schematic, partially sectional view of selected portions of yet another exemplary system for processing workpieces at a plurality of processing stations, particularly showing a spacer placement station firing spacer balls into a longitudinal groove of a workpiece as the workpiece is moving past the placement station, in accordance with aspects of the present teachings.

This example describes an exemplary workpiece processing system with multiple processing stations, including a spacer placement station; see FIG. 9.

System 280 may include a spacer placement station 282 that adds spacer elements (such as spacer balls 284, foam blocks, one or more rubber splines, etc.) to a workpiece 286. The spacer elements may be used, for example, to allow a panel in a frame and panel door to be free-floating, to allow the panel to expand and contract, and/or to dampen panel rattling, among others. The spacer elements may be configured to be received in a cavity formed in the workpiece, for example, a longitudinal groove 288. The longitudinal groove or other cavity may be formed upstream of the spacer placement station within system 280, for example, using a rip saw or a router that is oriented to cut longitudinally (with or without concurrent workpiece movement). Alternatively, the groove or other cavity may be formed outside of system 280 before the workpiece is processed by the system. The spacer placement station 282 may be configured to fire the spacer elements, shown at 290, at the workpiece without direct contact with the workpiece, as shown in the present illustration. For example, the spacer placement station may include a modified paint ball gun or similar firing device that can fire the spacer elements at the workpiece. Accordingly, in some examples, the spacer elements may be added to the workpiece while the workpiece is moving (and, generally, with the spacer placement station not moving), to save processing time. The spacer placement station may fire spacer elements vertically, as shown in the present illustration, horizontally, or along any other suitable path. Alternatively, a spacer(s) may be pressed into the groove or other cavity. In some examples, the spacer elements may be slightly oversized, so that they deform and stay in position when placed into the groove or other cavity.

Controller software may be configured to calculate where and/or when spacer elements should be fired at workpieces, as the workpieces are moving past the spacer placement station. For example, positions along a workpiece at which spacer elements are to be added may be determined by the controller software according to stored specifications of desired products. In particular, the controller software may determine which product or products are being produced from the workpiece, which of the produced products, if any, should include spacer elements, and what position or positions along the length of each product should include a spacer element. The positions of spacer elements may be predefined or may be calculated "on the fly." In an exemplary embodiment, spacer balls are placed three inches from each end of rails and two inches from each end on stiles. The software thus may include an algorithm that determines the length and part description of each product to be formed from a workpiece, and based on these two factors, calculates both the placement and frequency of spacer elements to be inserted and in turn the actual ordinate positions along the length of the workpiece. Accordingly, the spacer elements may be added to selected workpieces automatically and at predefined positions within these selected workpieces, in some cases while the workpieces are moving and/or without contacting the workpieces with the spacer placement station.

Example 5

This example describes exemplary workpiece processing systems with multiple processing stations, including a station for forming a joint surface.

Joints are sites where two or more components are joined together. Each component includes a joint surface that mates with a complementary joint surface of an adjacent component. Exemplary joint surfaces formed by workpiece processing may be joined with each other to produce finger joints, miter joints, mortise and tenon joints, dovetail joints, dado joints, lap joints, splined joints, tongue and groove joints, and/or the like.

A joint surface for joining to a complementary joint surface may be formed by removing material from any suitable surface of a workpiece using the systems of the present teachings. Accordingly, the joint surface may be formed on an end of a workpiece, an edge of a workpiece, and/or a face of a workpiece. For example, a mortise for a tenon (or a tenon for a mortise) may be routed automatically from a face, edge, or end of a workpiece. In some examples, the joint surface may be formed as a workpiece is cut, for example, a butt joint surface formed by an orthogonal crosscut, or a miter joint surface formed by a miter cut. In some examples, the joint surface may be formed on a cut end produced by cutting the workpiece in a system of the present teachings. For example, a finger joint surface may be formed with the newly cut end of a workpiece using a finger joint cutter after the workpiece has been cut by a saw station. After cutting, the newly created ends of the leading and trailing pieces may be separated, for example, by advancing the leading piece with a conveyor. The leading and/or trailing piece then may be clamped in position and automatically processed with a station that cuts finger joints.

Example 6

This example describes exemplary workpiece processing systems with multiple processing stations, including a station for forming a cavity and another station for inserting a joining member into the cavity.

Joints may be strengthened by using joining members that span joints. Such joining members may strengthen joints, for example, by increasing the surface area of a joint (and thus the surface area for a glue) and/or may swell after their installation, among others. Exemplary joining members include dowels, biscuits (used, for example, to span miter joints in frames), butterfly locks, or the like.

Processing systems of the present teachings may include processing stations configured to install joining members into workpieces automatically. The systems may include a processing station that forms a receiver cavity in a workpiece, and another processing station that inserts the joining member into the receiver cavity. The receiver cavity and the joining member may have complementary structure, so that a portion of the joining member fits into the receiver cavity, sometimes relatively snugly. In some examples, the joining member may include a coating of an adhesive when it is inserted. Alternatively, the receiver cavity may be processed at a glue station at which glue is injected automatically into the receiver cavity before the joining member is inserted. A partner component of the processed workpiece, with a complementary joint surface then may be joined with the workpiece and its joining member, to complete the joint. Joining the partner component may be performed outside the processing systems or automatically by the processing systems.

Example 7

Figure 10:
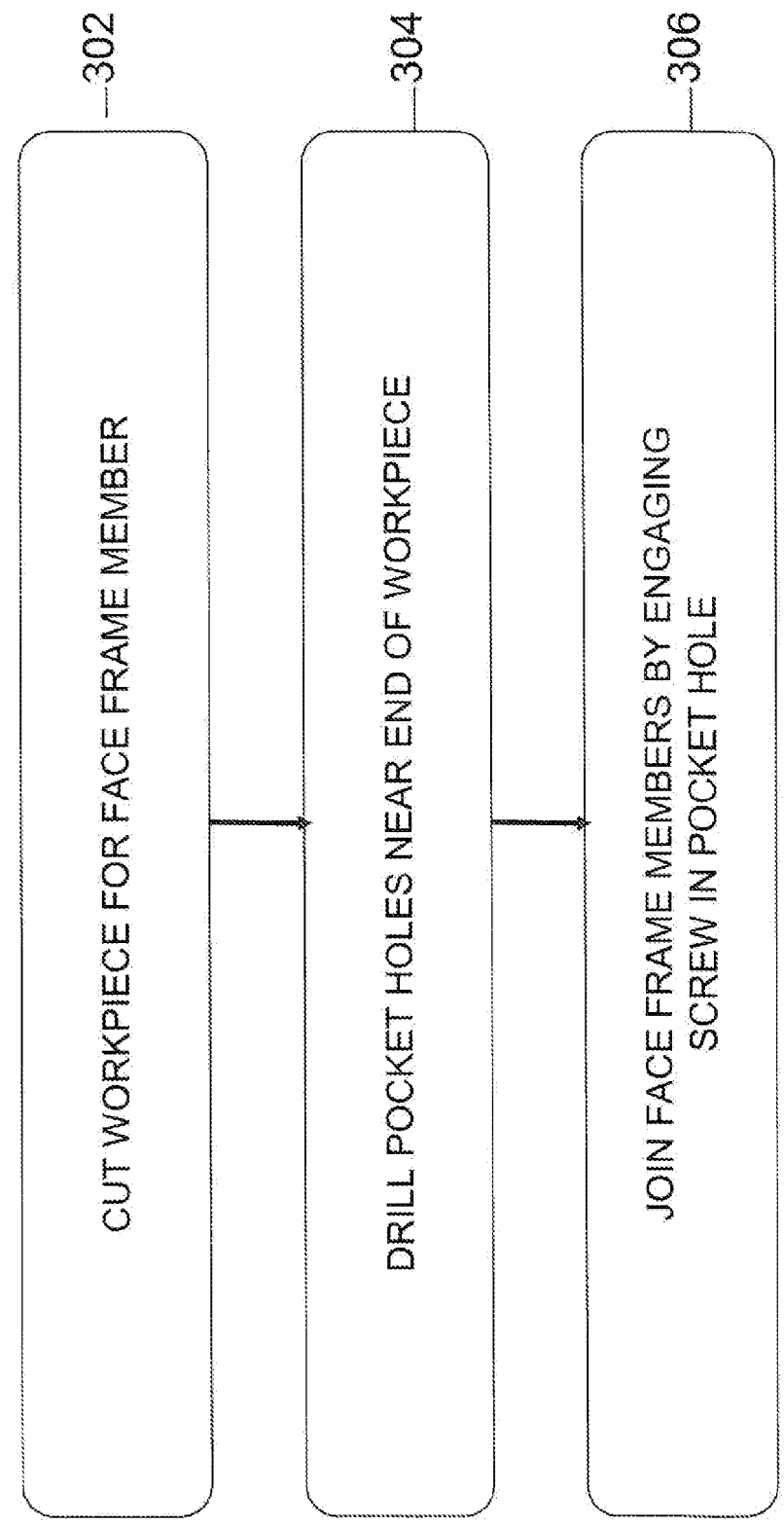
FIG. 10 is a flowchart of a sequence of operations that may be performed in an exemplary method of processing workpieces at two or more processing stations, in accordance with aspects of the present teachings.

As shown in FIG. 10, this example describes exemplary workpiece processing systems with multiple processing stations, including a drill station for forming a pocket hole in a workpiece.

Pocket holes are obliquely oriented holes that may be used, for example, to receive fasteners, such as screws, to secure a joint, such as a butt joint. The systems of the present teachings may be used to form pocket holes automatically. In some examples, the systems also may include a saw station. The pocket holes near an end of a workpiece product may be formed before or after the workpiece is cut. In exemplary embodiments, pocket holes configured to receive screws to join face frame members are drilled after cutting a workpiece to length.

As shown in FIG. 10, processing system 300 includes the steps of cutting a workpiece for a face frame member 302, drilling a pocket hole near an end of the workpiece 304, and joining face frame members by engaging a screw in the pocket hole in 306.

Example 8

This example describes exemplary workpiece processing systems with multiple processing stations for processing workpieces formed of metal.

The systems may be configured to cut and remove burrs from metal. Accordingly, the systems may include a cutting station (such as a saw station) and a deburring station. The systems may cut a metal workpiece to produce a newly cut end, and then may move the workpiece to the deburring station to remove any sharp edges of the newly cut end. The deburring station may include, for example, a rotating metal brush and/or a rotating wheel with sandpaper flaps, among others.

The systems may be configured to cut metal and then notch the newly cut end. Accordingly, the systems may include a cutting station (such as a saw station) and a notching station. After cutting a workpiece to produce a newly cut end, the systems may move the workpiece to the notching station for notching for the newly cut end. The resultant notched product may be suitable, for example, as a structural member of a window blind. The notched end may be configured to receive an end cap, so that a fastener or a string, among others, can be received in the notch.

The systems may be configured for automatic insertion of rivets. The rivets may include fastener structure, for example, a female or male thread, or a bracket, among others. The rivets may be inserted into a workpiece before, during, and/or after the workpiece is cut to length.

The systems may be configured for automatically tapping holes (that is, forming a thread in the holes). The systems may include a drill station and a tap station. A hole may be drilled automatically in a metal workpiece and then tapped afterward. In some embodiments, the tap station may be disposed downstream of the drill station. In some embodiments, the drill station and the tap station may be configured to drill and tap a hole while the workpiece is in the same position, that is, without moving the workpiece between operations.

The systems may be configured to automatically place fasteners into holes. The systems may include a drill station and a fastener placement station. After a hole is drilled in a workpiece, the fastener placement station may press a self-clinching fastener, such as PEM stud or nut, into the hole.

The systems may be configured to deform metal workpieces automatically. The systems may include a cutting station (such as a saw station) and a deformation station. Before, during, and/or after a workpiece is cut, the workpiece may be deformed, for example, bent, twisted, stamped, formed, etc. Deformation may be conducted, for example, by a press brake.

The systems may be configured to punch holes automatically. The systems may include a cutting station (such as a saw station) and a punch station. Before, during, and/or after a workpiece is cut to length, holes may be punched in the workpiece. Punching may be suitable, for example, in the window industry to provide an attachment site within an aluminum, perimeter frame member for an intermediate frame member of a window frame.

Example 9

This example describes exemplary workpiece processing systems with multiple processing stations that process workpieces for assembly of miter-fold boxes.

The systems may include a V-grooving machine and a glue station. The systems optionally may cut a workpiece to length. The V-grooving machine may form V-shaped transverse grooves in a face of the workpiece, before, during, and/or after cutting the workpiece to length. The grooves generally do not extend to the opposing face of the workpiece, for example, leaving a plastic backing of the workpiece uncut. The glue station then may apply glue to the V-grooves. The grooved workpiece with glue then may be folded to mate opposing surfaces of each V-groove, to form the sides of a box, optionally in the presence of a panel that fits into longitudinal grooves disposed on the sides. Folding may be performed automatically by the system, or manually or automatically outside the system. This resulting box may provide a drawer or speaker box, among others.

Example 10

This example describes exemplary workpiece processing systems with multiple processing stations that process workpieces for bending.

In the packaging industry, corner cushioning pieces (e.g., formed of cardboard or foam) may need to be cut to length from stock, and scored for bending. The systems thus may include a cutting station and a scoring station, which may operate in any suitable order on a workpiece.

Example 11

This example describes exemplary workpiece processing systems with multiple processing stations and configured to sort processed products. The systems may include various chutes or gates that may be operated automatically. Operation of the chutes or gates may be determined by a sorting algorithm that controls sorting of workpiece products according to product identity, product type, sets of related products, etc., so that the products are sorted into appropriate bins.

Example 12

This example describes exemplary workpiece processing systems with multiple processing stations, including a station for boring/drilling holes for attaching hinges. Hinge holes may be formed in door frame members and face frame members automatically, before, during, and/or after cutting the members to length.

Example 13

This example describes exemplary combinations of processing stations that may be included in the systems of the present teachings.

A processing system may include any suitable combination of two, three, four, or more processing stations, such as any of the processing stations of the present teachings. In some examples, the processing system may include a cutting station, such as a saw station, and at least one other processing station. The at least one other processing station may include a marking station, a printing station, a drilling station, a router station, a deburring station, a scoring station, a fluid-addition station (for application of paint, glue, varnish, etc.), a member addition station (for addition of one or more members, such as a dowels, biscuits, butterfly locks, fasteners, spacers, labels, etc.), a shearing station, a deformation station, a punching station, a folding station, a cutting station (such as a second saw station), a sanding station, and/or the like. In some examples, the processing system may include a cutting station (such as a saw station) and a marking station (such as a scoring, printing, or line-drawing station for creating a surface mark on a workpiece), and at least a third processing station (such as a drill station, a second cutting station, a routing station (with a router that removes material from the workpiece), a fluid-addition station, a member-addition station, etc.).

The stations may have any suitable disposition relative to each other and relative to a workpiece drive mechanism. In some examples, a first station may be disposed in a first position closest to the drive mechanism, a second station may be disposed in a second position that is spaced farther from the drive mechanism than the first position, and, optionally, third and/or higher order stations may be disposed in third and higher positions disposed farther from the workpiece drive mechanism than lower order positions. Each of the first, second, third, fourth, or higher order station may be a cutting station, a drill station, a marking station, a router station, a member-addition station, a fluid addition station, or any other processing station described herein. In some examples, first and second processing stations may be disposed with the second processing station closest to the drive mechanism, that is, so that regions of a workpiece are moved through the second processing station before the first processing station.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. A method of making a face frame assembly for a cabinet comprising providing a cut list including dimensions of processed pieces required for construction of face frames for cabinets, providing a supply of workpieces for processing into dimensions specified in the cut list, each workpiece being preprocessed into a substantially straight elongate form having a rectangular cross-section, providing an apparatus configured to cut length dimensions and to drill holes for receiving face frame screws in a workpiece from the supply in a single pass through the apparatus, and a computer connected to the apparatus, the apparatus having a linear processing path, a pusher configured for reciprocal movement along a length of the processing path to push a trailing end of an elongate workpiece having a long axis parallel to the processing path, and a plurality of processing stations arranged along the processing path downstream from the pusher, at least a first processing station including a saw orientated perpendicular to the processing path for cutting the workpiece in a direction perpendicular to the long axis of the workpiece, and at least a second processing station including a drilling device configured to drill holes in the workpiece for receiving face frame screws, entering the cut list into the computer, programming the computer with an optimization program configured to calculate an optimum processing plan for a workpiece based on a starting length of the workpiece, and current requirements specified in the cut list stored in the computer, selecting a first workpiece from the supply, inputting data into the computer including the length of the first workpiece, calculating, in the computer, an optimum plan for processing the first workpiece to satisfy current cut list requirements, driving the pusher, under computer control, along a length of the processing path to push the trailing end of the first workpiece down the processing path toward the processing stations, cutting the first workpiece, under computer control, perpendicular to the long axis of the workpiece at the first processing station, drilling a hole in the first workpiece at the second station for receiving a face frame screw, wherein the hole is drilled near an end of the first workpiece, and assembling the first workpiece with a second workpiece by securing a face frame screw in the hole of the first workpiece.

2. A method of making a face frame assembly for a cabinet comprising providing a cut list including dimensions of processed pieces required for construction of face frames for cabinets, providing a supply of workpieces for processing into dimensions specified in the cut list, each workpiece being preprocessed into a substantially straight elongate form having a rectangular cross-section, providing an apparatus configured to cut length dimensions and to drill holes for receiving face frame screws in a workpiece from the supply in a single pass through the apparatus, and a computer connected to the apparatus, the apparatus having a linear processing path, a pusher configured for reciprocal movement along a length of the processing path to push a trailing end of an elongate workpiece having a long axis parallel to the processing path, and a plurality of processing stations arranged along the processing path downstream from the pusher, at least a first processing station including a saw orientated perpendicular to the processing path for cutting the workpiece in a direction perpendicular to the long axis of the workpiece, and at least a second processing station including a drilling device configured to drill holes in the workpiece for receiving face frame screws, entering the cut list into the computer, programming the computer with an optimization program configured to calculate an optimum processing plan for a workpiece based on a starting length of the workpiece, and current requirements specified in the cut list stored in the computer, selecting a first workpiece from the supply, inputting data into the computer including the length of the first workpiece, calculating, in the computer, an optimum plan for processing the first workpiece to satisfy current cut list requirements, driving the pusher, under computer control, along a length of the processing path to push the trailing end of the first workpiece down the processing path toward the processing stations, cutting the first workpiece, under computer control, perpendicular to the long axis of the workpiece at the first processing station, drilling a hole in the first workpiece at the second station for receiving a face frame screw, wherein the drilling step is performed after the cutting step, and assembling the first workpiece with a second workpiece by securing a face frame screw in the hole of the first workpiece.

* * * * *